US011608016B2

(12) United States Patent
Dudar et al.

(10) Patent No.: US 11,608,016 B2
(45) Date of Patent: Mar. 21, 2023

(54) ENHANCED MANAGEMENT OF ELECTRICAL RESOURCES FOR ELECTRIC VEHICLES

(71) Applicant: Ford Global Technologies, LLC, Dearborn, MI (US)

(72) Inventors: Aed M. Dudar, Canton, MI (US); Mahmoud Yousef Ghannam, Canton, MI (US); Rajarshi Roychowdhury, Dearborn, MI (US); Mark Eifert, Park Ridge, IL (US)

(73) Assignee: Ford Global Technologies, LLC, Dearborn, MI (US)

( * ) Notice: Subject to any disclaimer, the term of this patent is extended or adjusted under 35 U.S.C. 154(b) by 13 days.

(21) Appl. No.: 17/316,833

(22) Filed: May 11, 2021

(65) Prior Publication Data

US 2022/0363209 A1    Nov. 17, 2022

(51) Int. Cl.
*B60Q 1/076* (2006.01)
*B60R 16/033* (2006.01)
(Continued)

(52) U.S. Cl.
CPC ............ *B60R 16/033* (2013.01); *B60Q 1/076* (2013.01); *B60Q 1/085* (2013.01); *B60Q 1/2603* (2013.01);
(Continued)

(58) Field of Classification Search
CPC .......... B60Q 2300/30; B60Q 2300/305; B60Q 2300/31; B60Q 2300/312; B60Q 2300/314; B60Q 2300/32; B60Q 2300/322; B60Q 2300/324; B60Q 2300/33; B60Q 2300/331; B60Q 2300/332; B60Q 2300/3321; B60Q 2300/333; B60Q 2300/334; B60Q 2300/335; B60Q 2300/336; B60Q 2300/337; B60Q 2300/338; B60Q 1/076; B60Q 1/085; B60Q 1/08
See application file for complete search history.

(56) References Cited

U.S. PATENT DOCUMENTS 6,396,397 B1 *  5/2002  Bos .......................... B60R 1/088
                                                        348/E7.086
8,817,090 B2    8/2014  Szczerba et al.
(Continued)

OTHER PUBLICATIONS

Vincent R. Tannahill et al., "Driver alerting system using range estimation of electric vehicles in real time under dynamically varying environmental conditions", IEEE Xplore, vol. 6, Issue2, 2020, 3 pages (abstract only).

*Primary Examiner* — Robert J May
(74) *Attorney, Agent, or Firm* — Brandon Hicks; Eversheds Sutherland (US) LLP (57) ABSTRACT

Devices, systems, and methods for management of electrical resources for electric vehicles. A method may include receiving, by a vehicle, sensor data indicative of a first luminosity of a location, and determining that the first luminosity of the location exceeds a luminosity threshold. The method may include determining, based on the first luminosity exceeding the luminosity threshold, a second luminosity to apply to lights of the vehicle while the vehicle is at the location, the second luminosity greater than zero. The method may include applying the second luminosity to the lights while the vehicle is at the location.

18 Claims, 5 Drawing Sheets

(51) Int. Cl.
*B60Q 1/08* (2006.01)
*B60Q 1/26* (2006.01)
*G01S 17/00* (2020.01)
*G01J 1/42* (2006.01)
*G01S 17/88* (2006.01)
*G01S 17/06* (2006.01)

(52) U.S. Cl.
CPC ............. *G01J 1/4204* (2013.01); *G01S 17/00* (2013.01); *G01S 17/88* (2013.01); *B60Q 2300/314* (2013.01); *G01J 2001/4266* (2013.01); *G01S 17/06* (2013.01)

(56) References Cited

U.S. PATENT DOCUMENTS

| | | |
|---|---|---|
| 9,230,183 B2 | 1/2016 | Bechtel et al. |
| 2016/0357262 A1 | 12/2016 | Ansari |
| 2018/0334099 A1* | 11/2018 | Gao ........................ H04N 5/232 |

* cited by examiner

FIG. 5

ENHANCED MANAGEMENT OF ELECTRICAL RESOURCES FOR ELECTRIC VEHICLES

BACKGROUND

People increasingly are using electric vehicles. Operation of some components of electrical vehicles requires battery power. For example, use of vehicle headlights on an electric vehicle may use electricity provided by a battery.

BRIEF DESCRIPTION OF THE DRAWINGS

The detailed description is set forth regarding the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

People increasingly are using electric vehicles (EVs), such as all-electric vehicles and hybrid electric vehicles. Unlike conventional vehicles where an active combustion engine can supply electric power to vehicle accessories, EVs do not have an alternator, so accessories use power from a propulsion battery.

Some vehicles include of electric power-consuming features such as heated seats, cooled seats, massaging seats, device chargers, onboard air conditioning (A/C) power outlet usage (e.g., 500 W), imbedded video entertainment systems, WI-FI, onboard speakers, personal light emitting diode (LED) or other lights, dual zone cabin climate control, and the like. Activation of such power features uses considerable electrical power, so the travel range of the vehicle may be reduced if a vehicle passenger activates the electrical loads for such power features, thereby draining the propulsion battery. Night driving in particular may require an additional electrical load as headlights have to be turned on. Some headlights may consumer considerable electrical power. Some vehicle passengers may use significant electric power, while others may use little if any electrical power. It is difficult to predict the amount of power customers that any passenger will consume in a car hailing application, for example. Thus, an EV may underestimate its power consumption during a drive cycle and risk electrical energy starvation, especially when driving at night or in places where daylight running lights are required and the headlights need to be used.

There is therefore a need for enhanced management of electrical resources for electric vehicles.

In one or more embodiments, power of a vehicle (e.g., an EV, an e-bike, a scooter, and the like) may be conserved by reducing the electrical load on the EV's battery, in particular, by reducing the electrical load required to operate vehicle lights (e.g., headlights, interior lights such as when in park or when a door or trunk is opened, etc.). By using roads with natural luminosity (e.g., from street lights, lights of other vehicles driving on a road, etc.), EVs may rely on the natural luminosity for light while reducing the luminosity output (e.g., brightness, intensity) of their lights (in accordance with relevant laws). For example, an EV may be directed to roads with more ambient light from sources other than EV, allowing the EV to reduce the luminosity output of its lights when driving or stopped on the roads.

In one or more embodiments, the EV may collect sensor data from its own vehicle sensors and/or sensors of other vehicles. For example, any EV may be equipped with sensors such as light detection and ranging (LIDAR) sensors, solar sensors (e.g., solar panels), infrared sensors (e.g., cameras, etc.), and the like. The vehicle sensors may detect data that may be used to determine an ambient (e.g., environmental) luminosity of any location (e.g., a road). Based on the luminosity of any location, a vehicle may determine whether to drive to the location or to another location having a higher luminosity, thereby allowing the vehicle to apply a reduced luminosity to its lights. For example, when a location's luminosity exceeds a threshold luminosity (e.g., another location's luminosity, a pre-set luminosity, etc.), the vehicle may select the location (e.g., select one road or another), and/or may set vehicle lights luminosity to a lower than full luminosity (e.g., reduce lights luminosity without completely turning off the lights).

In one or more embodiments, the luminosity of any location may be determined by the following equation:

$$\text{Luminosity Output} = k1 * \text{LIDAR data} + k2 * \text{solar data} + k3 * \text{infrared data} \quad (1)$$

where k1, k2, and k3 are scaling factors. The LIDAR data, the solar data, and the infrared data may be detected by one vehicle or by multiple vehicles (e.g., the average LIDAR data, the average solar data, the average infrared data, etc.), and may be data collected at a particular location (e.g., a stretch of road, such as 1/10 of a mile or another increment), for example as determined by global positioning coordinates of vehicles or other vehicle location data. In this manner, the luminosity output of any location may vary at different times of day, days of the week, months of the year, etc. For example, luminance is a function of the number of photons detected by a sensor. In this manner, the LIDAR data may indicate the number of photons detected by LIDAR sensors; the solar data may indicate the number of photons detected by solar sensors, and the infrared data may indicate the number of photons detected by infrared sensors. Accounting for the different sensors' data as in Equation (1) above is beneficial because vehicle sensors may have different boundaries and directions. For example, solar panels on a vehicle roof may detect street lights, whereas infrared cameras and LIDAR sensors of a vehicle may detect ambient light emitted by other vehicles, signs, buildings, and the like.

In one or more embodiments, the EV or a centralized system (e.g., a cloud-based system) may generate and update luminosity map data to indicate the luminosity of different locations. The luminosity map data may be updated based on a visibility metric (e.g., based on whether visibility is less than a threshold visibility, e.g., when foggy, based on darkness hours, e.g., a time when ambient light drops below a luminosity threshold, after the sun goes down, etc.). The luminosity map data may be presented using a vehicle device or other user device to allow the vehicle or driver to select driving directions based on locations that have sufficient ambient light to allow for the vehicle to apply a non-zero luminosity that is less than the full luminosity of the lights. The vehicle also may estimate a driving range before running out of power based on the luminosity that is needed to power the vehicle's lights. In this manner, the driving range of the vehicle may be extended by requiring less power applied to a vehicle's lights. When an EV has to choose between several driving routes, the EV may select driving route based on the length of the route and the luminosity required for the route. For example, an efficient LED headlamp system may extend vehicle range by nearly six miles (9.5 km). A 28 watt LED system emits only 196 grams of carbon dioxide per 100 kilometers compared to 768 grams of carbon dioxide per 100 kilometers from conventional 110 watt H7 halogen bulbs. Whether the goal is reduced fuel consumption or reduced carbon emissions, LED lighting is a beneficial technology. Daylight rules governing vehicle headlight usage vary between different countries, which drives complexity in the vehicle hardware and software to meet requirement and regulations of various geographic area. Reading GPS or other location data, day/time data, and ambient light intensity data, a vehicle may adjust vehicle headlight intensity (e.g., luminosity) and may minimize variations of light requirements (e.g., for example Canada requirements versus the U.S. requirements), with seamless effort to import/export units (e.g., used vehicles). Also, the electrical resource management enhancements herein allow vehicle drivers to drive across countries and meet road-light requirements without manual inputs or concerns.

In one or more embodiments, a vehicle may select a driving route based on the amount of vehicle fuel and/or electrical energy (e.g., for an EV) that is available/saved in comparison with the required fuel or electricity consumption needed. For example, when a driving route requires more fuel or electrical energy than a vehicle has available, the vehicle may select a different driving route that requires less energy to complete (e.g., due to the environmental luminosity that allows the vehicle to reduce its luminosity). The energy that to run vehicle lights in some vehicles over regulatory test cycle may account for less than 5% of the energy required for propulsion. The energy may be electrical energy or the potential energy that is stored in fuel. The percentage remains the same. Deviating from the shortest route between two points to a longer route may result in an increase in fuel use that is very non-linear with respect to the change in route length. A small deviation in the route may cause an increase in fuel use that may not be offset by dimming the lights. In this manner, the total energy consumption of a vehicle may be taken into consideration.

In one or more embodiments, in addition to vehicles using the luminosity map to find light-friendly routes, other mobility types may benefit. People riding scooters, bikes, or even pedestrians who walk or jog at night can use the map to plan a route that is well-lit for safety purposes and better visibility. In addition, delivery drones may seek to fly along a route that is well-lit for better visibility and to also reduce the drone's own light consumption. When a drone flies in the dark, it may have to use its headlights at full capacity. With ambient lights generated by other vehicles, infrastructure, etc., the drone can use the map and plan a flight route along the high-luminosity zones while modulating its own lights, thereby extending the flying range of the drone. The drone may also contribute data to a luminosity cloud (e.g., centralized system) if its equipped with light sensors (e.g., as satellites may do at night). The luminosity map also may be used by people who seek a dark area for star gazing. Some recreational vehicle (RV) and outdoor customers may desire to camp for the night in areas where there is low light pollution in order to stargaze and bond with nature and the night sky. The luminosity map offers people options as to where to park/set up camp in order to best view the night stars. In this manner, the luminosity map generated by connected vehicles based on their vehicle sensor data may be used both to reduce power consumption of EVs and other vehicles, and to show dark areas along a freeway/road and provide campers with knowledge as to the darkest night sky zones.

Illustrative Embodiments

Figure 1:
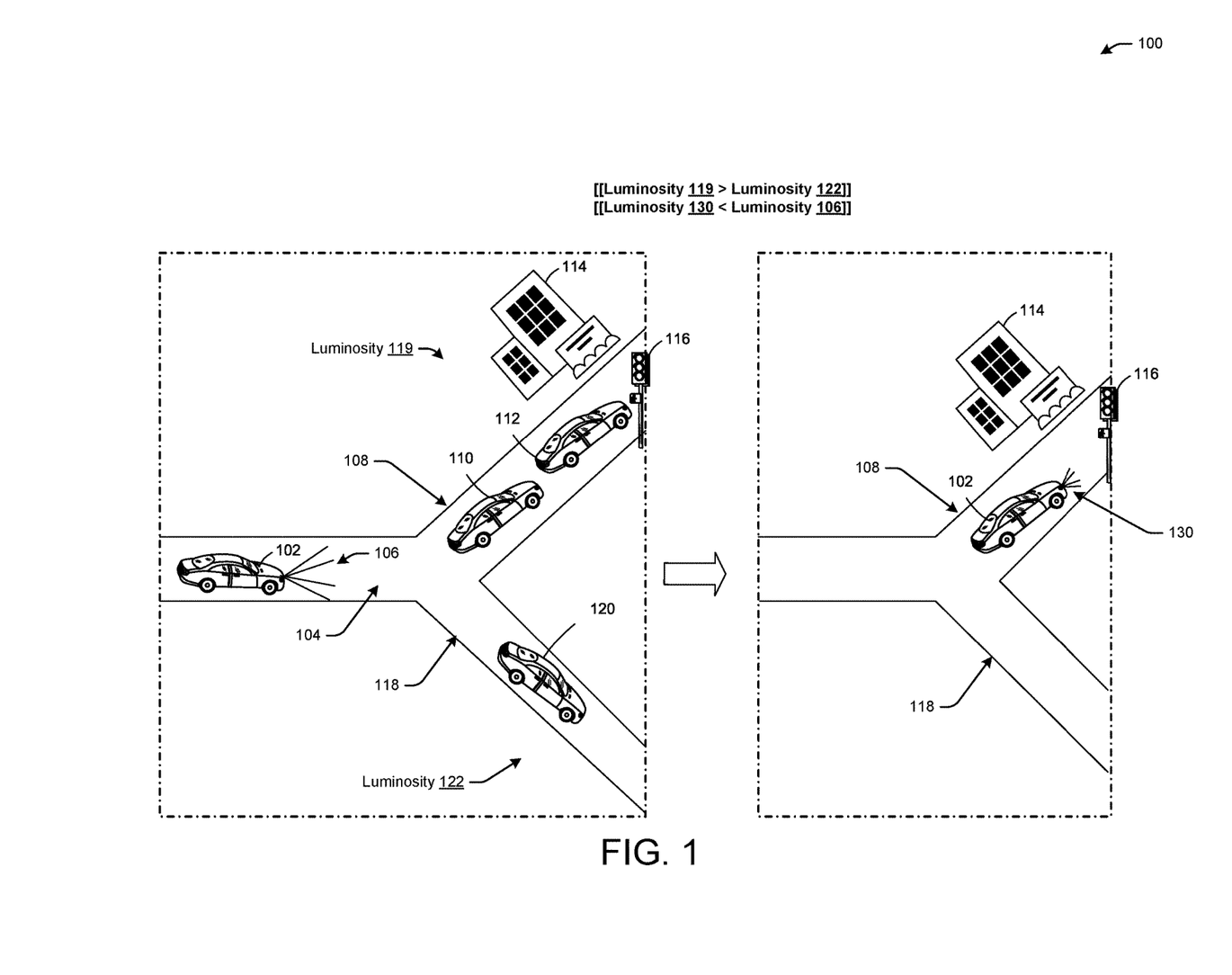
FIG. 1 depicts an illustrative system for managing electrical resources for vehicles in which techniques and structures for providing the systems and methods disclosed herein may be implemented.

Turning now to the drawings, FIG. 1 depicts an illustrative system 100 for managing electrical resources for vehicles for autonomous vehicles in which techniques and structures for providing the systems and methods disclosed herein may be implemented.

Referring to FIG. 1, the system 100 may include a vehicle 102 (e.g., an EV, autonomous vehicle, etc.) driving on a road 104. The vehicle 102 may apply a luminosity 106 to its lights (e.g., headlights, other exterior lights, interior lights, etc.) while driving on the road 104. On another road (e.g., road 108), other vehicles may be driving with their headlights or other lights on (e.g., vehicle 110, vehicle 112). Other ambient light may be present on the road 108, such as light emitted by a building 114 (e.g., infrastructure), light emitted by objects (e.g., street light 116, street signs, etc.). On another road (e.g., road 118), a vehicle 120 may be driving with its headlights on. Based on the light emitted on or near the roads, the roads may experience different levels of luminosity. For example, the light emitted by the vehicles 110 and 112, the building 114, and the street light 116 may result in a luminosity 119 for the road 108. Light emitted by the vehicle 120 may result in a luminosity experienced by the road 118. As shown, the luminosity 119 of the road 108 may be greater than the luminosity 122 of the road 118. As a result, the vehicle 102 may select a driving route that includes the road 108 instead a driving route that includes the road 118 because of the greater luminosity of the road 108. Because of the greater luminosity of the road 108, the vehicle 102 may determine and apply a luminosity 130 to apply to its headlights (or other exterior or interior lights). In this manner, because the luminosity 119 of the road 108 may be sufficiently high (e.g., exceeding a threshold/greater than the luminosity 122), the vehicle 102 may reduce its headlight luminosity 130 (e.g., with respect to the headlight luminosity 106), allowing for power savings while driving.

In one or more embodiments, the vehicle 102 may collect sensor data (e.g., as shown with respect to FIG. 3) from its own vehicle sensors and/or sensors of other vehicles (e.g., the vehicles 110, 112, and/or 120). Based on the luminosity of any location, the vehicle 102 may determine whether to drive to on the road 108 or to drive on the road 118, thereby allowing the vehicle 102 to apply a reduced luminosity to its headlights or other lights (e.g., the luminosity 130). For example, when a location's luminosity exceeds a threshold luminosity (e.g., another location's luminosity, a pre-set luminosity, etc.), the vehicle 102 may select the location (e.g., select one road or another), and/or may set vehicle headlight luminosity to a lower than full luminosity (e.g., reduce headlight luminosity without completely turning off the headlights).

In one or more embodiments, the luminosity of any location (e.g., the luminosity 119, the luminosity 122) may be determined by Equation (1) above. The luminosity output of any location may vary at different times of day, days of the week, months of the year, etc. For example, luminance is a function of the number of photons detected by a sensor. In this manner, LIDAR data may indicate the number of photons detected by LIDAR sensors; solar data may indicate the number of photons detected by solar sensors, and infrared data may indicate the number of photons detected by infrared sensors. Accounting for the different sensors' data as in Equation (1) above is beneficial because vehicle sensors may have different boundaries and directions.

Figure 2:
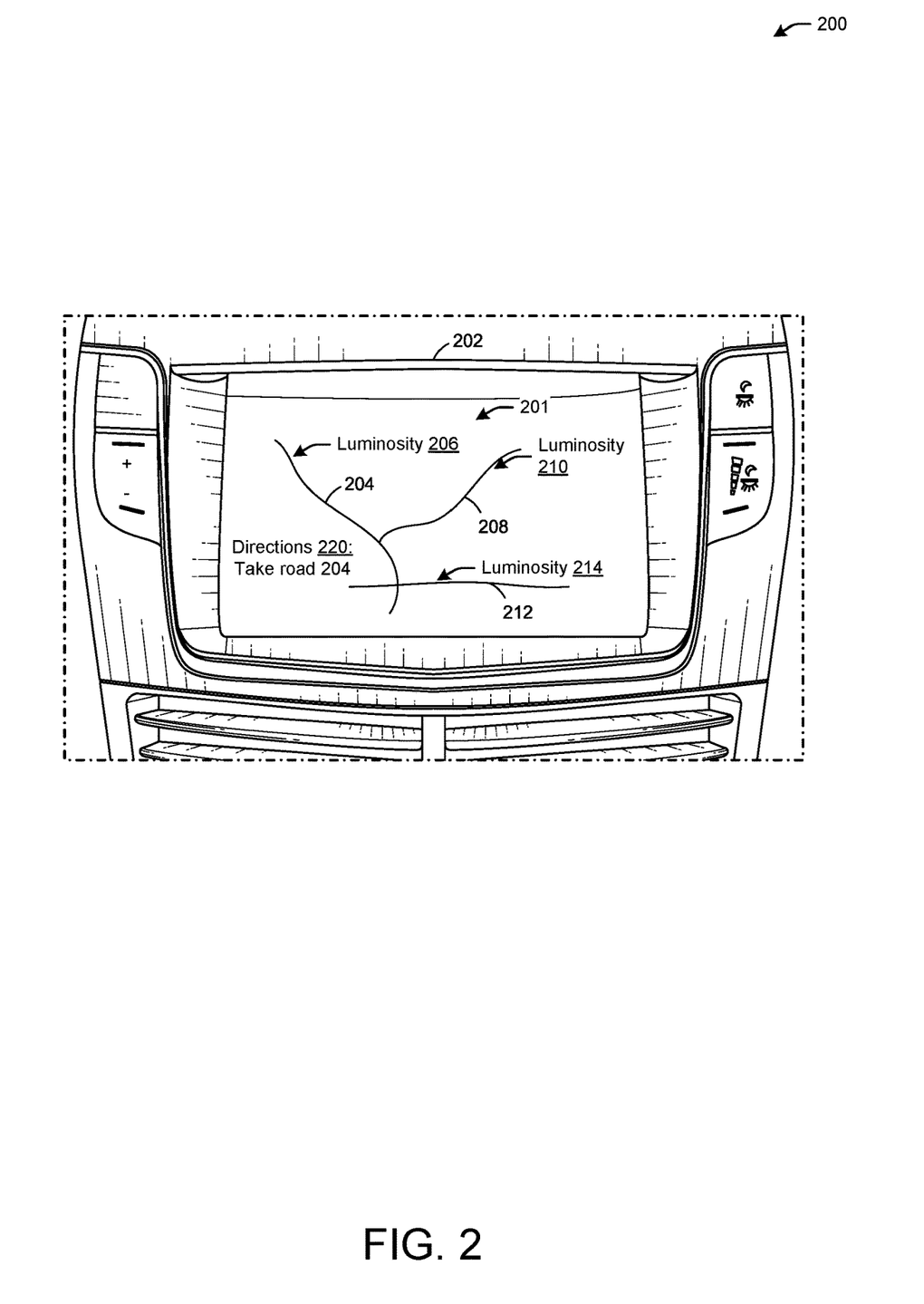
FIG. 2 depicts an illustrative presentation of luminosity map data for managing electrical resources for vehicles.

FIG. 2 depicts an illustrative presentation 200 of luminosity map data for managing electrical resources for vehicles.

Referring to FIG. 2, the vehicle 102 of FIG. 1 may include an in-vehicle display 202 (or users devices of passengers of the vehicle 102, not shown, may have a display similar to the in-vehicle display 202) capable of presenting map data 201 (e.g., luminosity map data). As shown, the map data 201 may include roads and indications of the luminosity of the roads. For example, a road 204 may be presented with a luminosity 206. A road 208 may be presented with a luminosity 210. A road 212 may be presented with a luminosity 214, and so on. The luminosities 206, 210, and 214 may be determined according to Equation (1) above (e.g., based on ambient light from vehicles, objects, devices, etc. on or near the roads, as shown in FIG. 1). Based on the luminosities 206, 210, and 214, the vehicle 102 may select the road 204 because it may have the greatest luminosity at a given time, allowing the vehicle 102 to apply a reduced luminosity to its headlights or other lights (e.g., the luminosity 130 of FIG. 1) when driving on the road 204. In this manner, the in-vehicle display 202 may present driving directions 220 as part of the map data 201, the driving directions 220 presenting roads selected based on their luminosity.

Figure 3:
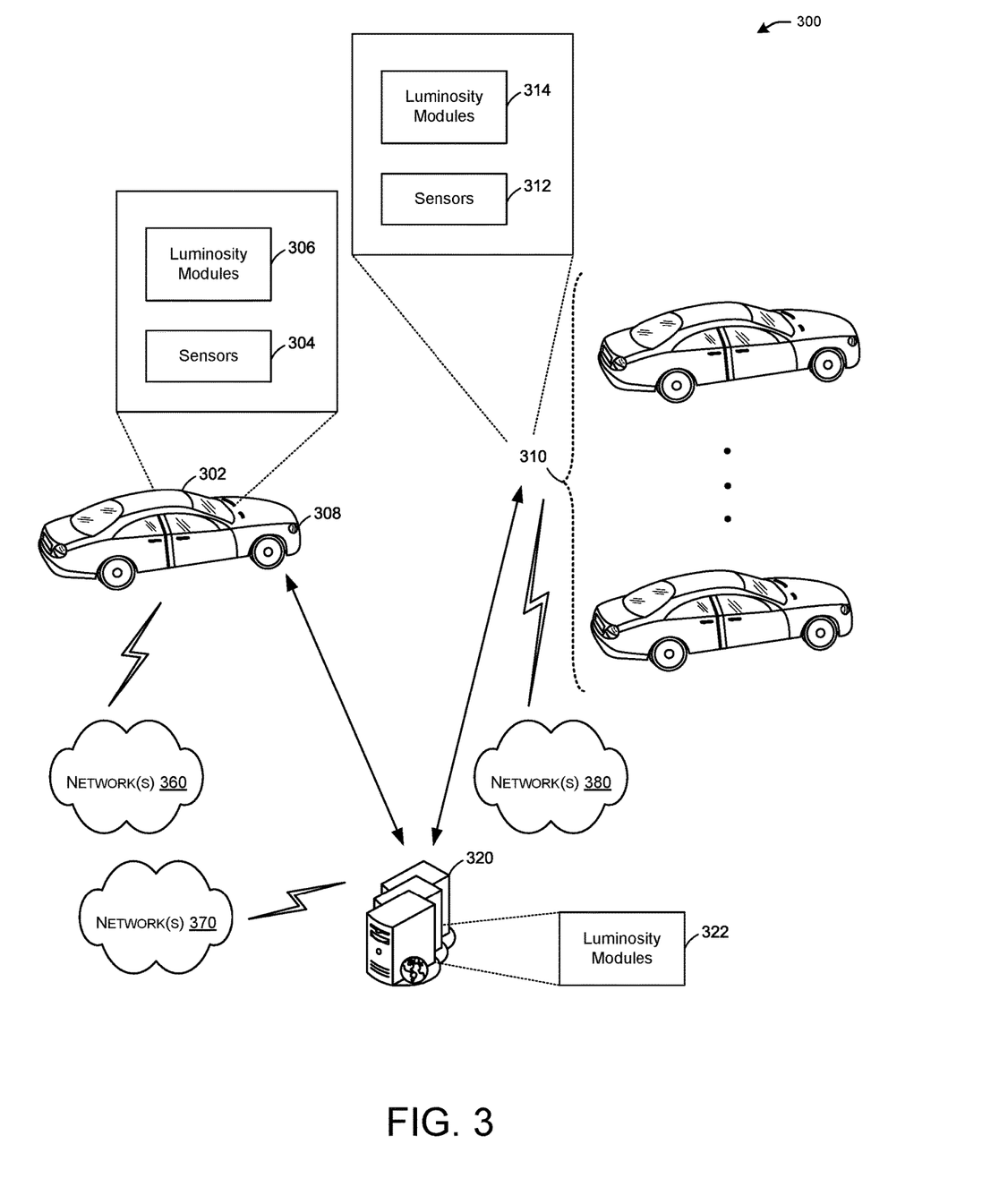
FIG. 3 depicts an illustrative communication system for managing electrical resources for vehicles.

In one or more embodiments, the vehicle 102 (or a centralized system as shown in FIG. 3) may generate and update the map data 201 to indicate the luminosity of different locations. The map data 201 may be updated based on a visibility metric (e.g., based on whether visibility is less than a threshold visibility, e.g., when foggy, based on darkness hours, e.g., a time when ambient light drops below a luminosity threshold, after the sun goes down, etc.). The vehicle 102 also may estimate a driving range before running out of power based on the luminosity that is needed to power the vehicle's headlights or other lights. In this manner, the driving range of the vehicle may be extended by requiring less power applied to a vehicle's headlights or other lights. When the vehicle 102 has to choose between several driving routes, the vehicle 102 may select driving route based on the length of the route and the luminosity required for the route. For example, an efficient LED headlamp system may extend vehicle range by nearly six miles (9.5 km). A 28 watt LED system emits only 196 grams of carbon dioxide per 100 kilometers compared to 768 grams of carbon dioxide per 100 kilometers from conventional 110 watt H7 halogen bulbs. In this manner, the vehicle 102 may determine the amount of power needed for a driving route based on the distance of the driving route and the light luminance needed when driving along the route (e.g., to remain above a luminosity threshold).

In one or more embodiments, the in-vehicle display 202 may include a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, or the like.

FIG. 3 depicts an illustrative communication system 300 for managing electrical resources for vehicles.

Referring to FIG. 3, the communication system 300 may allow for many vehicles to communicate sensor data to allow for location-based luminance determinations (e.g., according to Equation (1) above), in accordance with relevant laws. For example, a vehicle 302 (e.g., similar to the vehicle 102 of FIG. 1) may have sensors 304 (e.g., LIDAR sensors, solar sensors, infrared sensors, etc.) and luminosity modules 306 (e.g., capable of determining luminosities of locations, selecting driving routes based on luminosities, generating and presenting the map data 201 of FIG. 2, and adjusting the luminosity levels with which to apply to vehicle headlights 308 or other vehicle lights). For example, the vehicle headlights 308 may be capable of emitting light according to an applied luminosity, such as the luminosity 106 and the luminosity 130 of FIG. 1). Other vehicles 310 (e.g., similar to the vehicles 110, 112, and 120 of FIG. 1) may have sensors 312 (e.g., similar to the sensors 304) and luminosity modules 314 (e.g., similar to the sensors 304). The vehicles 302 and 310 may provide their sensor data, including location information, to a remote system 320 (e.g., a cloud-based system), which may have luminosity modules 322 capable of aggregating luminosity data from multiple vehicles and generating luminosity map data (e.g., the map data 201 of FIG. 2).

In one or more embodiments, the vehicle 302 may collect sensor data from its own vehicle sensors 304 and/or the sensors 312 of other vehicles (e.g., the vehicles 310). For example, the sensors 304 and 312 may include LIDAR sensors, solar sensors (e.g., solar panels), infrared sensors (e.g., cameras, etc.), and the like. The sensors 304 and 312 may detect data that may be used to determine an ambient (e.g., environmental) luminosity of any location (e.g., a road). Based on the luminosity of any location, the vehicle 302 may determine whether to drive to the location or to another location having a higher luminosity, thereby allowing the vehicle 302 to apply a reduced luminosity to its headlights 308. For example, when a location's luminosity exceeds a threshold luminosity (e.g., another location's luminosity, a pre-set luminosity, etc.), the vehicle 302 may select the location (e.g., select one road or another), and/or may set vehicle headlight luminosity to a lower than full luminosity (e.g., reduce headlight luminosity without completely turning off the headlights).

In one or more embodiments, the LIDAR data, the solar data, and the infrared data may be detected by one vehicle or by multiple vehicles (e.g., the average LIDAR data, the average solar data, the average infrared data, etc.), and may be data collected at a particular location (e.g., a stretch of road, such as 1/10 of a mile or another increment), for example as determined by global positioning coordinates of the vehicles 302 and 310 or other vehicle location data. In this manner, the luminosity output of any location may vary at different times of day, days of the week, months of the year, etc. For example, luminance is a function of the number of photons detected by a sensor. In this manner, the LIDAR data may indicate the number of photons detected by LIDAR sensors; the solar data may indicate the number of photons detected by solar sensors, and the infrared data may indicate the number of photons detected by infrared sensors.

In one or more embodiments, the vehicles 302 or 310, or the remote system 320, may generate and update luminosity map data (e.g., the map data 201) to indicate the luminosity of different locations. The luminosity map data may be updated based on a visibility metric (e.g., based on whether visibility is less than a threshold visibility, e.g., when foggy, based on darkness hours, e.g., a time when ambient light drops below a luminosity threshold, after the sun goes down, etc.). The luminosity map data may be presented using a vehicle device (e.g., the in-vehicle display 202 of FIG. 2) or other user device to allow the vehicle 302 or driver to select driving directions based on locations that have sufficient ambient light to allow for the vehicle to apply a non-zero luminosity that is less than the full luminosity of the headlights 308. The vehicle 302 also may estimate a driving range before running out of power based on the luminosity that is needed to power the vehicle's headlights 308. In this manner, the driving range of the vehicle 302 may be extended by requiring less power applied to a vehicle's headlights 308. When the vehicle 302 has to choose between several driving routes, the vehicle 302 may select driving route based on the length of the route and the luminosity required for the route. Reading GPS or other location data, day/time data, and ambient light intensity data, the vehicle 302 may adjust vehicle headlight intensity (e.g., luminosity).

In one or more embodiments, the remote system 320 may include a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, or the like.

Any of the vehicles 302 or 310, and/or the remote system 320 may be configured to communicate with each other via one or more communications networks 360, 370, and/or 380 wirelessly or wired. Any of the communications networks 360, 370, and/or 380 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 360, 370, and/or 380 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 360, 370, and/or 380 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Figure 4:
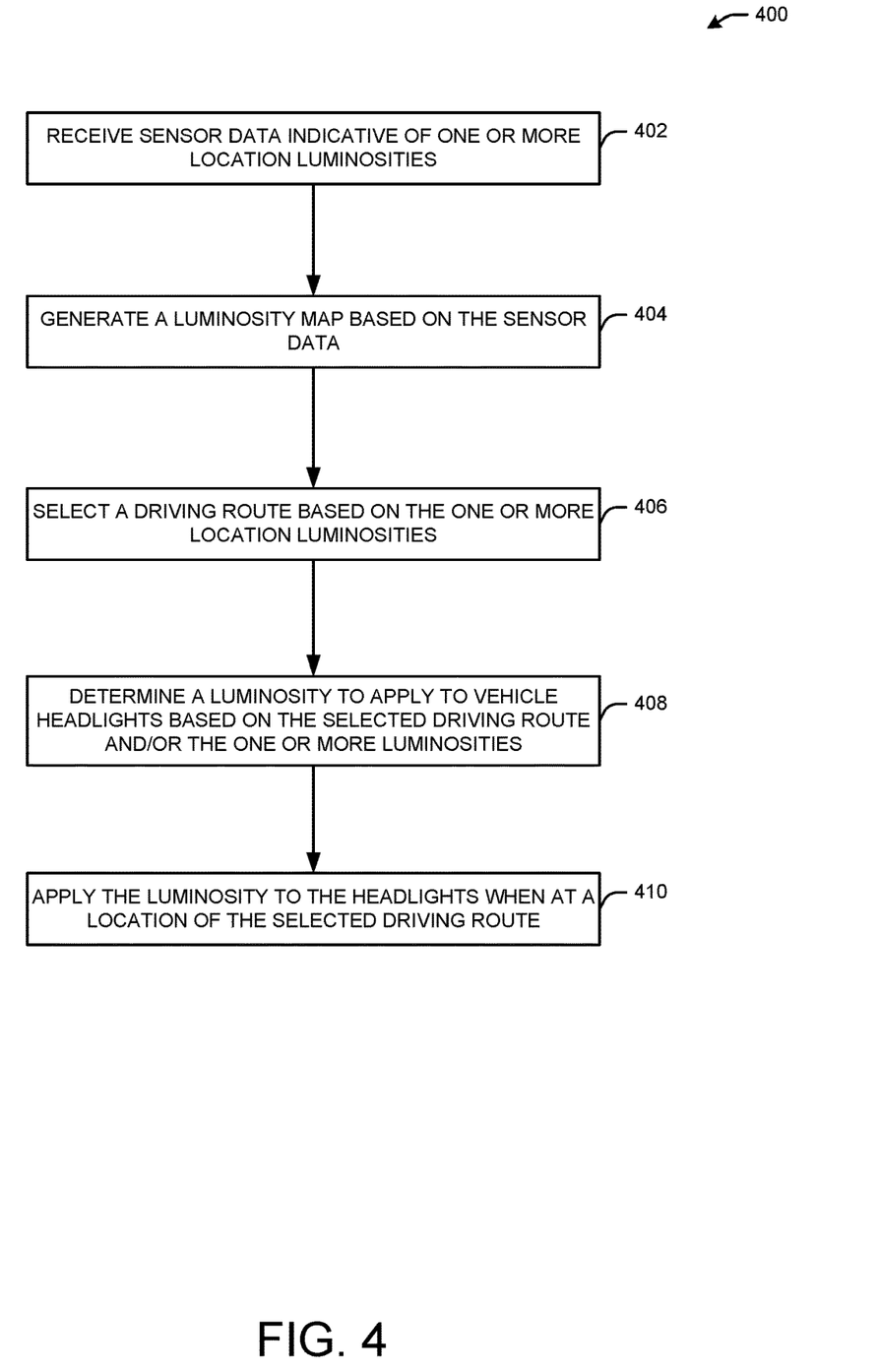
FIG. 4 is a flowchart of an example method for managing electrical resources for vehicles.

FIG. 4 is a flowchart of an example method 400 for managing electrical resources for vehicles.

At block 402, a device (or system, e.g., the luminosity modules 306 of FIG. 3) may receive sensor data (e.g., LIDAR sensor data, solar sensor data, infrared sensor data, etc. from the sensors 304 of FIG. 3). The sensor data may be indicative of luminosities of different locations (e.g., the luminosity 119 for the road 108 of FIG. 1, the luminosity 122 for the road 118 of FIG. 1). In one or more embodiments, the luminosity of any location may be determined by Equation (1) above, where k1, k2, and k3 are scaling factors. The LIDAR data, the solar data, and the infrared data may be detected by one vehicle or by multiple vehicles (e.g., the average LIDAR data, the average solar data, the average infrared data, etc.), and may be data collected at a particular location (e.g., a stretch of road, such as 1/10 of a mile or another increment), for example as determined by global positioning coordinates of vehicles or other vehicle location data. In this manner, the luminosity output of any location may vary at different times of day, days of the week, months of the year, etc. For example, luminance is a function of the number of photons detected by a sensor. In this manner, the LIDAR data may indicate the number of photons detected by LIDAR sensors; the solar data may indicate the number of photons detected by solar sensors, and the infrared data may indicate the number of photons detected by infrared sensors. Accounting for the different sensors' data as in Equation (1) above is beneficial because vehicle sensors may have different boundaries and directions. For example, solar panels on a vehicle roof may detect street lights, whereas infrared cameras and LIDAR sensors of a vehicle may detect ambient light emitted by other vehicles, signs, buildings, and the like.

At block 404, the device may generate or receive a luminosity map (e.g., the map data 201 of FIG. 2). In one or more embodiments, the device or a centralized system (e.g., the remote system 320 of FIG. 3) may generate and update luminosity map data to indicate the luminosity of different locations. The luminosity map data may be updated based on a visibility metric (e.g., based on whether visibility is less than a threshold visibility, e.g., when foggy, based on darkness hours, e.g., a time when ambient light drops below a luminosity threshold, after the sun goes down, etc.). The luminosity map data may be presented using the device to allow the vehicle or driver to select driving directions based on locations that have sufficient ambient light to allow for the vehicle to apply a non-zero luminosity that is less than the full luminosity of the headlights or other vehicle lights.

At block 406, the device may select a driving route based on the location luminosities (e.g., based on the route that will result in the lowest electrical load needed, such as the route with the highest luminosity, thereby allowing for a reduction in headlight or other vehicle light luminosity while driving along the selected route). The device also may estimate a driving range before running out of power based on the luminosity that is needed to power the vehicle's headlights. In this manner, the driving range of the vehicle may be extended by requiring less power applied to a vehicle's headlights. When an EV has to choose between several driving routes, the device may select driving route based on the length of the route and the luminosity required for the route. Based on the aggregated luminosity output along the road segment, the device may select a route that maximizes the road's natural luminosity from infrastructure lights and/or vehicles travelling on the road. (vehicle density). Furthermore, the device dynamically may adjust the DTE metric to account for the energy savings from less headlight power consumption. The driving route may be selected based on the vehicle's available energy. For example, a small deviation in a driving route may cause an increase in fuel use that may not be offset by dimming the lights. Therefore, a shorter driving route with less luminosity may still require less vehicle energy than a longer driving route with greater luminosity.

At block 408, the device may determine a luminosity to apply to vehicle headlights or other vehicle lights (e.g., the headlights 308 of FIG. 3) based on the selected driving route and/or the luminosities of the driving route. For example, when the luminosity of a location is above a luminosity threshold (e.g., greater than another location's luminosity or a set threshold), the device may select a non-zero luminosity to apply to the headlights (e.g., reducing the headlight luminosity).

At block 410, the device may apply the luminosity to the headlights or other vehicle lights when driving along the selected route (e.g., when at a location having the determined luminosity). Different locations may have different minimum headlight luminosity requirements, so the applied luminosity level may need to be above a regulated level.

The examples above are not meant to be limiting.

Figure 5:
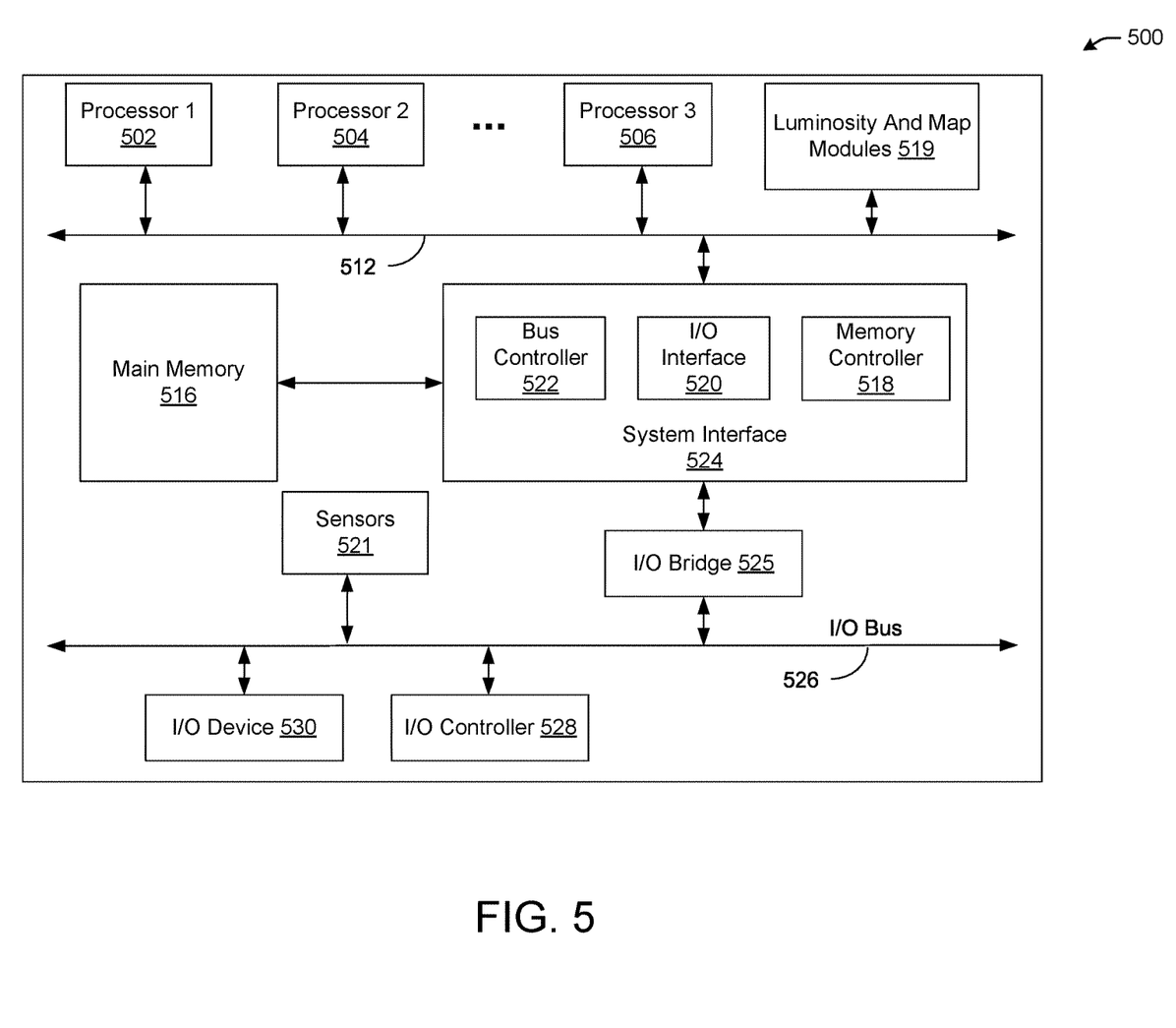
FIG. 5 is a block diagram illustrating an example of a computing device or computer system upon which any of one or more techniques (e.g., methods) may be performed, in accordance with one or more example embodiments of the present disclosure.

FIG. 5 is a block diagram illustrating an example of a computing device or computer system upon which any of one or more techniques (e.g., methods) may be performed, in accordance with one or more example embodiments of the present disclosure.

For example, the computing system 500 of FIG. 5 may include or represent the system 100 of FIG. 1, the vehicles 302 and 310, and/or the remote system 320, in whole or in part. The computer system (system) includes one or more processors 502-506. Processors 502-506 may include one or more internal levels of cache (not shown) and a bus controller (e.g., bus controller 522) or bus interface (e.g., I/O interface 520) unit to direct interaction with the processor bus 512.

Processor bus 512, also known as the host bus or the front side bus, may be used to couple the processors 502-506, luminosity and map modules 519 (e.g., capable of performing the method 400 of FIG. 4), sensors 521 (e.g., the sensors 304 or the sensors 312 of FIG. 3) with the system interface 524. System interface 524 may be connected to the processor bus 512 to interface other components of the system 500 with the processor bus 512. For example, system interface 524 may include a memory controller 518 for interfacing a main memory 516 with the processor bus 512. The main memory 516 typically includes one or more memory cards and a control circuit (not shown). System interface 524 may also include an input/output (I/O) interface 520 to interface one or more I/O bridges 525 or I/O devices 530 with the processor bus 512. One or more I/O controllers and/or I/O devices may be connected with the I/O bus 526, such as I/O controller 528 and I/O device 530, as illustrated.

I/O device 530 may also include an input device (not shown), such as an alphanumeric input device, including alphanumeric and other keys for communicating information and/or command selections to the processors 502-506, and/or the luminosity and map modules 519. Another type of user input device includes cursor control, such as a mouse, a trackball, or cursor direction keys for communicating direction information and command selections to the processors 502-506, and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506 and/or the luminosity and map modules 519. Main memory 516 also may be used for storing temporary variables or other intermediate information during execution of instructions by the processors 502-506 and/or the luminosity and map modules 519. System 500 may include read-only memory (ROM) and/or other static storage device coupled to the processor bus 512 for storing static information and instructions for the processors 502-506 and/or the luminosity and map modules 519. The system outlined in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 and/or the luminosity and map modules 519 to perform the process steps described herein. In alternative embodiments, circuitry may be used in place of or in combination with the software instructions. Thus, embodiments of the present disclosure may include both hardware and software components.

According to one embodiment, the processors 502-506 may represent machine learning models. For example, the processors 502-506 may allow for neural networking and/or other machine learning techniques used to operate the vehicle 102 of FIG. 1. For example, the processors 502-506 may include tensor processing units (TPUs) having artificial intelligence application-specific integrated circuits (ASICs).

In one or more embodiments, the computer system 500 may perform any of the steps of the processes described with respect to FIG. 4.

Various embodiments may be implemented fully or partially in software and/or firmware. This software and/or firmware may take the form of instructions contained in or on a non-transitory computer-readable storage medium. Those instructions may then be read and executed by one or more processors to enable the performance of the operations described herein. The instructions may be in any suitable form, such as, but not limited to, source code, compiled code, interpreted code, executable code, static code, dynamic code, and the like. Such a computer-readable medium may include any tangible non-transitory medium for storing information in a form readable by one or more computers, such as but not limited to read-only memory (ROM); random access memory (RAM); magnetic disk storage media; optical storage media; a flash memory, etc.

A machine-readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, solid state devices (SSDs), and the like. The one or more memory devices (not shown) may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 516, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or any other manner.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method, comprising:
receiving, by at least one processor of a vehicle, sensor data indicative of a first luminosity of a location;
determining, by the at least one processor, that the first luminosity of the location exceeds a luminosity threshold;
determining, by the at least one processor, based on the first luminosity exceeding the luminosity threshold, a second luminosity to apply to lights of the vehicle while the vehicle is at the location, the second luminosity greater than zero;
applying, by the at least one processor, the second luminosity to the lights while the vehicle is at the location;
receiving second sensor data indicative of a third luminosity of a second location;
generating, using the sensor data and second sensor data, a luminosity map indicative of the location, the first luminosity, the second location, and the third luminosity; and
selecting, based on a comparison of the first luminosity to the third luminosity, the location, wherein determining the second luminosity to apply to the lights of the vehicle is based on the selection of the location.

2. The method of claim 1, wherein the first luminosity of the location is associated with a first time of day, the method further comprising:
receiving second sensor data indicative of a third luminosity of the location associated with a second time of day,
wherein determining the second luminosity to apply to the lights of the vehicle is based on the first time of day.

3. The method of claim 1, wherein the sensor data comprises light detection and ranging (LIDAR) data, solar data, and infrared data, the method further comprising:
determining, based on the LIDAR data, the solar data, and the infrared data, the first luminosity.

4. The method of claim 3, wherein determining the first luminosity comprises determining a sum of a first scaling factor multiplied by the LIDAR data, a second scaling factor multiplied by the solar data, and a third scaling factor multiplied by the infrared data.

5. The method of claim 1, further comprising:
generating first luminosity map data indicative of the first luminosity;
determining a metric associated with visibility; and
generating, based on a comparison of the metric to a visibility threshold, second luminosity map data indicative of a third luminosity of the location.

6. The method of claim 1, wherein the sensor data is detected by a second vehicle.

7. A device of a vehicle, the device comprising memory coupled to at least one processor, the at least one processor configured to:
receive sensor data indicative of a first luminosity of a location;
determine that the first luminosity of the location exceeds a luminosity threshold;
determine, based on the first luminosity exceeding the luminosity threshold, a second luminosity to apply to lights of the vehicle while the vehicle is at the location, the second luminosity greater than zero, a second luminosity to apply to lights of the vehicle; and
apply the second luminosity to the lights while the vehicle is at the location,
wherein the first luminosity of the location is associated with a first time of day, wherein the at least one processor is further configured to receive second sensor data indicative of a third luminosity of the location associated with a second time of day, and
wherein to determine the second luminosity to apply to the lights of the vehicle is based on the first time of day.

8. The device of claim 7, wherein the at least one processor is further configured to:
receive second sensor data indicative of a third luminosity of a second location;
generate, using the sensor data and second sensor data, a luminosity map indicative of the location, the first luminosity, the second location, and the third luminosity; and
select, based on a comparison of the first luminosity to the third luminosity, the location,
wherein to determine the second luminosity to apply to the lights of the vehicle is based on the selection of the location.

9. The device of claim 7, wherein the sensor data comprises light detection and ranging (LIDAR) data, solar data, and infrared data, wherein the at least one processor is further configured to:
determine, based on the LIDAR data, the solar data, and the infrared data, the first luminosity.

10. The device of claim 9, wherein to determine the first luminosity comprises to determine a sum of a first scaling factor multiplied by the LIDAR data, a second scaling factor multiplied by the solar data, and a third scaling factor multiplied by the infrared data.

11. The device of claim 7, wherein the at least one processor is further configured to:
generate first luminosity map data indicative of the first luminosity;
determine a metric associated with visibility; and
generate, based on a comparison of the metric to a visibility threshold, second luminosity map data indicative of a third luminosity of the location.

12. The device of claim 7, wherein the sensor data is detected by a second vehicle.

13. The device of claim 7, further comprising a LIDAR sensor, a solar sensor, and an infrared sensor, wherein the sensor data are detected by the LIDAR sensor, the solar sensor, and the infrared sensor.

14. The device of claim 7, wherein the at least one processor is further configured to:
generate first luminosity map data indicative of the first luminosity;
determine a metric associated with visibility; and
generate, based on a comparison of the metric to a visibility threshold, second luminosity map data indicative of a third luminosity of the location.

15. A vehicle system comprising:
a LIDAR sensor;
a solar sensor;
an infrared sensor; and
memory coupled to at least one processor, the at least one processor configured to:
receive sensor data from the LIDAR sensor, the solar sensor, and the infrared sensor, the sensor data indicative of a first luminosity of a location;
determine that the first luminosity of the location exceeds a luminosity threshold;
determine, based on the first luminosity exceeding the luminosity threshold, a second luminosity to apply to lights of the vehicle while the vehicle is at the location, the second luminosity greater than zero, a second luminosity to apply to lights of the vehicle; and
apply the second luminosity to the lights while the vehicle is at the location,
wherein the sensor data comprises LIDAR data, solar data, and infrared data, and wherein to determine the first luminosity comprises to determine a sum of a first scaling factor multiplied by LIDAR data, a second scaling factor multiplied by the solar data, and a third scaling factor multiplied by the infrared data.

16. The system of claim 15, wherein the at least one processor is further configured to:
receive second sensor data indicative of a third luminosity of a second location;
generate, using the sensor data and second sensor data, a luminosity map indicative of the location, the first luminosity, the second location, and the third luminosity; and
select, based on a comparison of the first luminosity to the third luminosity, the location, wherein to determine the second luminosity to apply to the lights of the vehicle is based on the selection of the location.

17. The system of claim 15, wherein the first luminosity of the location is associated with a first time of day, wherein the at least one processor is further configured to:
receive second sensor data indicative of a third luminosity of the location associated with a second time of day,
wherein to determine the second luminosity to apply to the lights of the vehicle is based on the first time of day.

18. A method, comprising:
receiving, by at least one processor of a vehicle, sensor data indicative of a first luminosity of a location;
determining, by the at least one processor, that the first luminosity of the location exceeds a luminosity threshold;
determining, by the at least one processor, based on the first luminosity exceeding the luminosity threshold, a second luminosity to apply to lights of the vehicle while the vehicle is at the location, the second luminosity greater than zero;
applying, by the at least one processor, the second luminosity to the lights while the vehicle is at the location;
generating first luminosity map data indicative of the first luminosity;
determining a metric associated with visibility; and
generating, based on a comparison of the metric to a visibility threshold, second luminosity map data indicative of a third luminosity of the location.

* * * * *